(12) United States Patent
Detleffsen

(10) Patent No.: US 8,136,419 B2
(45) Date of Patent: Mar. 20, 2012

(54) BEARING FOR A GEARWHEEL WHICH SERVES AS A REVERSING GEAR AND AS A SHIFTABLE FREE GEAR

(75) Inventor: Nico Detleffsen, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 759 days.

(21) Appl. No.: 12/065,931

(22) PCT Filed: Aug. 26, 2006

(86) PCT No.: PCT/EP2006/008382
§ 371 (c)(1),
(2), (4) Date: Mar. 6, 2008

(87) PCT Pub. No.: WO2007/031189
PCT Pub. Date: Mar. 22, 2007

(65) Prior Publication Data
US 2008/0223161 A1    Sep. 18, 2008

(30) Foreign Application Priority Data
Sep. 13, 2005 (DE) .................. 10 2005 043 477

(51) Int. Cl.
*F16H 3/08* (2006.01)
*F16C 33/48* (2006.01)
(52) U.S. Cl. ......................... 74/325; 384/572
(58) Field of Classification Search ............ 74/325; 384/572
See application file for complete search history.

(56) References Cited

U.S. PATENT DOCUMENTS

| 2,460,630 | A | * | 2/1949 | Fawick | ..................... 74/411 |
| 4,223,570 | A | * | 9/1980 | Yamamori et al. | ............... 475/71 |
| 4,406,179 | A | * | 9/1983 | Numazawa et al. | ........... 475/311 |
| 4,793,200 | A | * | 12/1988 | McDonald | ..................... 74/331 |
| 4,836,348 | A |   | 6/1989 | Knödel et al. | |

(Continued)

FOREIGN PATENT DOCUMENTS
DE    3929677    1/1991
(Continued)

OTHER PUBLICATIONS

Johannes Looman, Zahnradgetriebe, Jun. 1996, ISBN:3-540-60336-0, pp. 166-168.*

(Continued)

*Primary Examiner* — Tisha Lewis
(74) *Attorney, Agent, or Firm* — Ingrassia Fisher & Lorenz, P.C.

(57) ABSTRACT

A transmission for a motor vehicle featured with an internal combustion engine has a helical reversing gear wheel, which is mounted on a dual-row cylinder roller bearing with left-hand cylinder rollers and with right-hand cylinder rollers, which are supported on the inside, in each case, on a circular centre rim in the reversing gear wheel. The left-hand cylinder rollers and the right-hand cylinder rollers are held in a bearing cage. The bearing cage is configured in such a way that the force flow for axial forces between the reversing gear wheel and its transmission shaft, omitting the bearing cage, is introduced through the centre rim and by way of end faces of the cylinder rollers directly adjacent thereto, through the opposing end faces of the cylinder rollers and through adjacent components into the input shaft.

3 Claims, 3 Drawing Sheets

U.S. PATENT DOCUMENTS

| | | | |
|---|---|---|---|
| 5,333,512 A * | 8/1994 | Pruss et al. | 74/331 |
| 5,458,421 A | 10/1995 | Giese | |
| 6,238,098 B1 * | 5/2001 | Knoll et al. | 384/572 |
| 2006/0201268 A1 | 9/2006 | Fink et al. | |

FOREIGN PATENT DOCUMENTS

| | | | |
|---|---|---|---|
| DE | 19860688 A1 | | 7/2000 |
| DE | 10054759 A1 | * | 5/2002 |
| DE | 10329870 | | 1/2005 |
| DE | 102006052855 | * | 5/2008 |
| JP | 9049526 | | 2/1997 |

OTHER PUBLICATIONS

Translation of DE10054759A1, done on Nov. 3, 2010.*
Translation of Looman, J. et al, pp. 166-168 on Nov. 7, 2011.*
International Searching Authority, International Search Report for Application No. PCT/EP2006/008382, dated Nov. 27, 2006.
Looman, J., et al. "Zahnradgetriebe: Grundlagen, Konstruktionen, Anwendungen in Fahrzeugen," 1996, pp. 166-168, Heidelberg, New York.
Schiemann, S. "Lagerungen Der Wellen Und Zahnraeder in Stirnradgetrieben," Antriebstechnik, Vereinigte Fachverlage, Jul. 1, 1993, pp. 34, 36-39, Mainz, Germany.

* cited by examiner

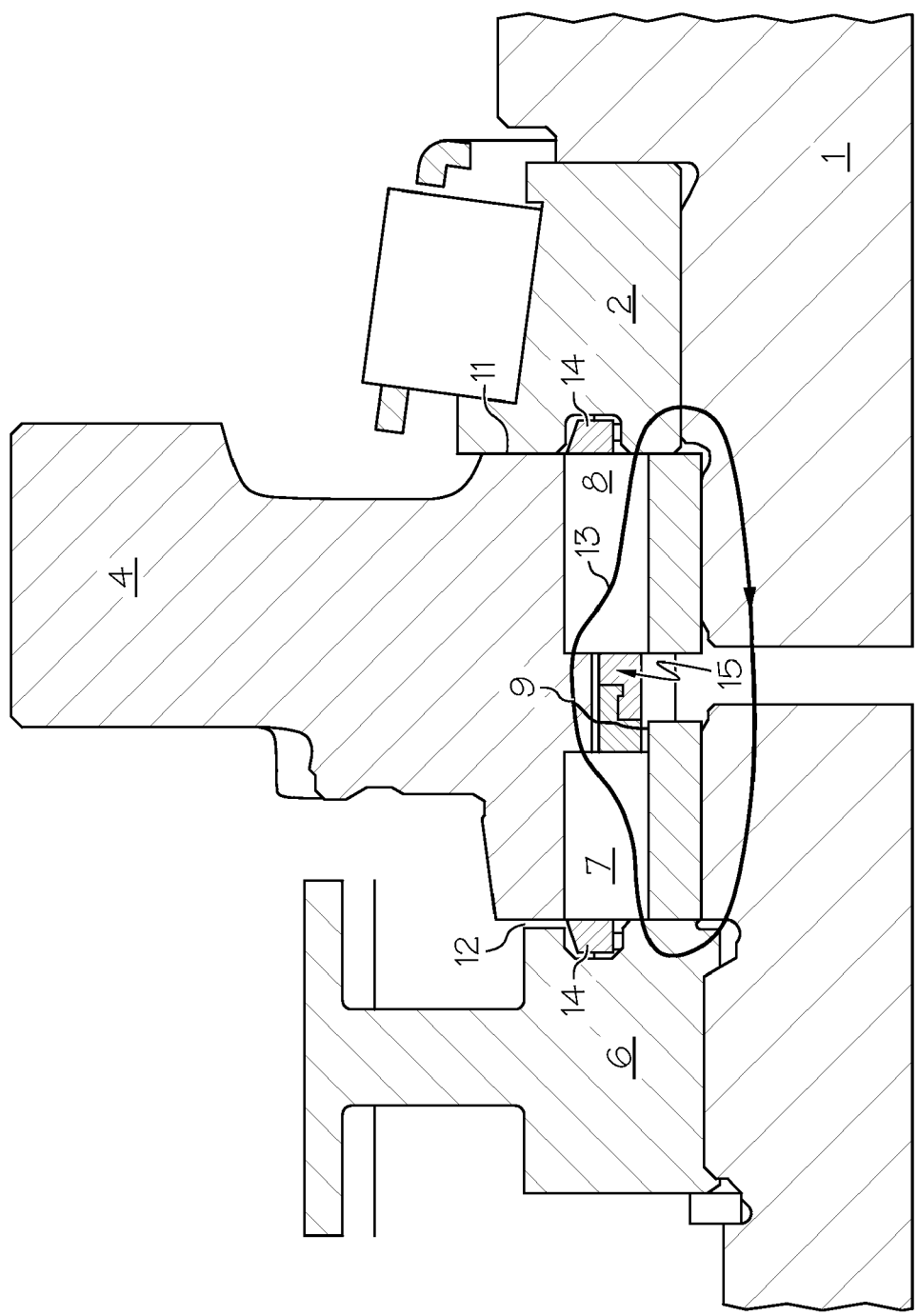

BEARING FOR A GEARWHEEL WHICH SERVES AS A REVERSING GEAR AND AS A SHIFTABLE FREE GEAR

CROSS-REFERENCE TO RELATED APPLICATIONS

This application is a U.S. National-Stage entry under 35 U.S.C. §371 based on International Application No. PCT/EP2006/008382, filed Aug. 26, 2006, which was published under PCT Article 21(2) and which claims priority to German Application No. DE 10 2005 043 477.0, filed Sep. 13, 2005.

TECHNICAL FIELD

The invention generally relates to a transmission, and more particularly to a transmission with a specially configured main shaft.

BACKGROUND

Reversing pinions or idler pinions or idlers, which are located on a main shaft or intermediate shaft, are frequently used in transmissions for the forward and reverse operation of motor vehicles.

On the one hand, the mounting of the idler should withstand large radial forces that occur during use in first gear or in reverse gear. At the same time, large axial forces occur in helical idlers.

DE 103 453 50 A1, JP 1 120 432 and DE 103 298 70 deal with the absorbing of axial forces such as occur in transmissions. DE 218 844 A1, JP 9 049 526 and DE 4 332 038 A1 show radial bearing cages which are configured such that the radial bearing can also absorb axial forces.

At least one object of the invention is to provide a loadable transmission which only has a small overall size. Other objects, desirable features and characteristics will become apparent from the subsequent summary, detailed description, and appended claims, taken in conjunction with the accompanying drawings and forgoing technical field and background.

SUMMARY

This object and other objects are achieved with an internal combustion engine, wherein the transmission has an input shaft, an output shaft and main shafts, on which transmission gear wheels are arranged, which in each case form gear pairings and of which at least one can be selectively locked by means of a selector sleeve on its respective transmission shaft, wherein one of the gear wheels is configured as a helical reversing gear wheel and can be engaged selectively for a forward gear pairing or for a reverse gear pairing, wherein the reversing gear wheel is mounted on a dual-row cylinder roller bearing with left-hand cylinder rollers and with right-hand cylinder rollers, which are supported on the inside, in each case, on a circular centre rim in the reversing gear wheel, the left-hand cylinder rollers and the right-hand cylinder rollers being held in a bearing cage, the bearing cage being configured in such a way that the force flow for axial forces between the reversing gear wheel and its transmission shaft, omitting the bearing cage, is introduced through the centre rim and by way of end faces of the cylinder rollers directly adjacent thereto, through the opposing end faces of the cylinder rollers and through adjacent components into the input shaft. This object and other objects are also achieved with an internal combustion engine, wherein the transmission has an input shaft, an output shaft and main shafts, on which transmission gear wheels are arranged, which in each case form gear pairings and of which at least one can be selectively locked by means of a selector sleeve on its respective transmission shaft, wherein one of the gear wheels is configured as a helical reversing gear wheel and can be selectively engaged for a forward gear pairing or for a reverse gear pairing, wherein the reversing gear wheel is mounted on a dual-row cylinder roller bearing with left-hand cylinder rollers and with right-hand cylinder rollers, which are supported on the inside in each case on a circular centre rim in the reversing gear wheel, the left-hand cylinder rollers and the right-hand cylinder rollers being held in a two-part bearing cage, the bearing cage parts of which are snapped into one another in a connecting region.

The invention proceeds, in this case, from the recognition that the known designs can be improved in that the mounting of the idler is configured in a special manner.

On the one hand, dual-row cylinder roller bearings, the cage of which is divided, are used instead of needle bearings. The cage halves can be snapped into one another. This produces simple assembly of the transmission because the idler placed on the main shaft can be provided with the two bearing halves. The cage halves are generally bearing cage parts here which can be snapped into one another in a connecting region.

In this case, a bearing cage part may have a peripheral groove in the connecting region. If the other bearing cage part, in the connecting region, has at least one flexible holding lug which, when the two bearing cage parts are assembled, is snapped into the groove, a particularly simple design is produced.

A centre rim in the idler between the two bearing halves provides a transmission of the axial forces from the idler to the bearing bodies.

In contrast to the prior art, at least some end faces of the cylindrical bearing bodies received in the bearing cage should not rest on the bearing cages themselves, which are in turn supported on the adjacent faces in the transmission. In the invention, axial forces are passed directly by way of the bearing bodies to adjacent support faces in the transmission, and specifically without loading the bearing cage.

If an idler mounting of this type is used a great load carrying ability and a low overall size are produced with simultaneously low production costs.

BRIEF DESCRIPTION OF THE DRAWINGS

The present invention will hereinafter be described in conjunction with the following drawing figures, wherein like numerals denote like elements.

FIG. 3 shows a sectional view in the region of an idler pinion of the gearing from FIG. 1 and FIG. 2.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
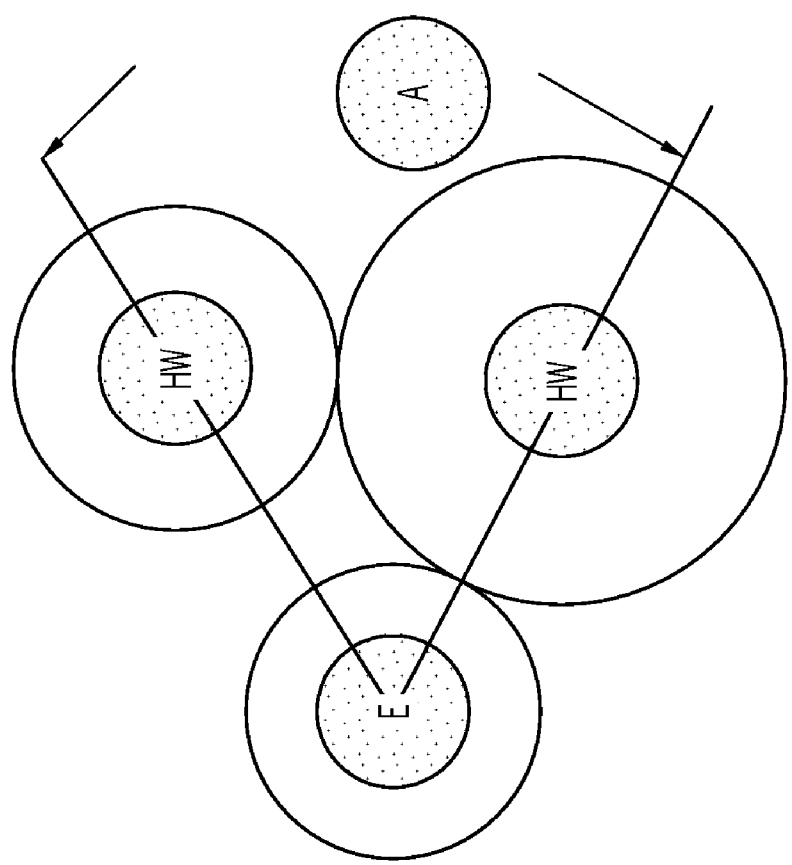
FIG. 1 shows a schematic axial view of a motor vehicle transmission.
Figure 2:
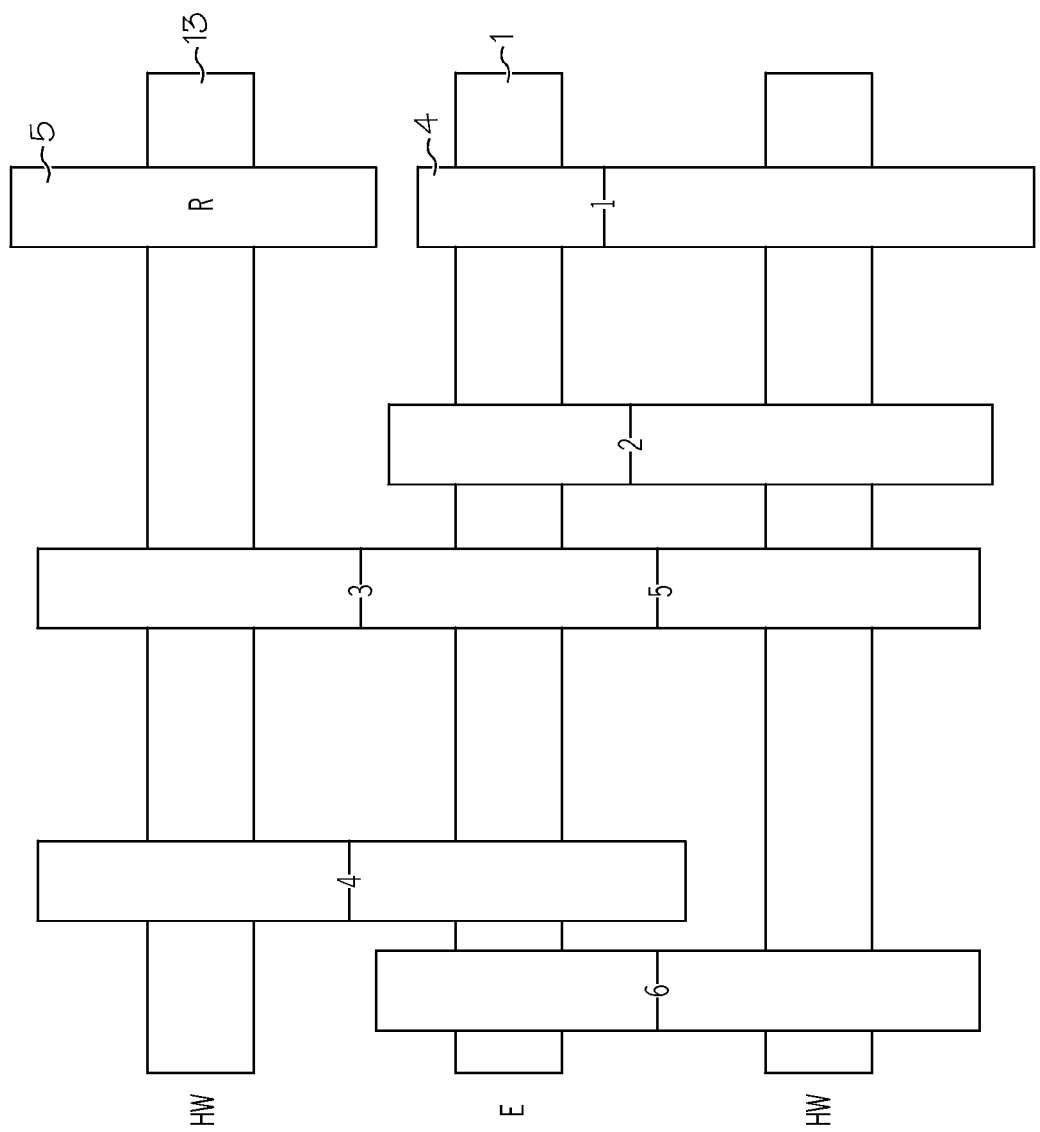
FIG. 2 shows a schematic side view of the motor vehicle transmission from FIG. 1.

FIGS. 1 and 2 show a transmission for a motor vehicle with an internal combustion engine. The transmission has an input shaft E or 1, an output shaft A and two main shafts HW located one above the other.

A large number of transmission gear wheels which in each case form pairings for the gears 1 to 6 is arranged on these transmission shafts. The gear order number is given in each case on the relevant gear wheel pairing in FIG. 2. Connections between the transmission wheels and the gear shafts are produced by means of selector sleeves, not shown.

One of the gear wheels for the "first gear" namely the gear wheel 4 is used as a so-called "idler". The mounting of this idler gear wheel 4 is shown more precisely in FIG. 3. Reference numerals are shown in a cornered box.

As can be seen there, the idler 4 is radially mounted on two cylinder rollers 7, 8 which are supported on the inside on a circular shoulder 9, in each case. This shoulder 9 is also called a "centre rim".

During operation, if the idler gear wheel 4 is being used as a deflector wheel for the reverse gear "R", the latter rotates on the input shaft 1, specifically with a radial mounting arrangement by means of the cylinder rollers 7 and 8, which are held in a bearing cage 14.

In addition to the radial forces, axial forces then occur because the idler gear wheel 4 is actually helical. These axial forces are introduced by way of the centre rim 9 and—differently, depending on the direction of the axial force—by way of the end faces of the cylinders rollers 7 or 8 into the input shaft 1. In the view in FIG. 1, to introduce this axial force, either the inner ring 2 of an adjacent tapered roller bearing is used or, on the other side, the adjacent inner ring of a sleeve carrier 6. The force flow is made clear here by a closed force line 13. As is clearly seen, the axial forces are not transmitted by way of the bearing cage 14.

The bearing cage 14 is configured in two parts, it being possible to snap the two halves together by means of a snap connection 15. The left-hand bearing cage part has a peripheral groove here in the connecting region 15. The right-hand bearing cage part has, in the connecting region 15, flexible holding lugs, which are snapped into the groove when the two bearing cage parts are assembled.

This snapping in of a bearing cage of a needle bearing plays a part in the invention inasmuch as the cylinder roller bearings 7 and 8 are also snapped together during assembly with their cage halves in order to form a unit that is easy to handle together with the idler gear wheel 4. The idler 4 when placed on the input shaft 1 can also be retrospectively provided with the cage halves.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A transmission for a motor vehicle featured with an internal combustion engine, wherein the transmission has an input shaft, an output shaft and main shafts, on which transmission gear wheels are arranged, which in each case form gear pairings and of which at least one can be selectively locked by means of a selector sleeve on its respective transmission shaft, wherein one of the gear wheels is configured as a helical reversing gear wheel and can be engaged selectively for a forward gear pairing or for a reverse gear pairing, wherein the reversing gear wheel is mounted on a dual-row cylinder roller bearing with left-hand cylinder rollers and with right-hand cylinder rollers, which are supported on the inside, in each case, on a circular centre rim in the reversing gear wheel, the left-hand cylinder rollers and the right-hand cylinder rollers being held in a bearing cage, the bearing cage being configured in such a way that the force flow for axial forces between the reversing gear wheel and its transmission shaft, omitting the bearing cage, is introduced through the centre rim and by way of end faces of the cylinder rollers directly adjacent thereto and through adjacent components into the input shaft.

2. A transmission for a motor vehicle according to claim 1 wherein the bearing cage is a two-part bearing cage, the bearing cage parts of which are snapped into one another in a connecting region.

3. The transmission according to claim 2, wherein one bearing cage part has a peripheral groove in the connecting region and in that the other bearing cage part, in the connecting region, has at least one flexible holding lug, which when the two bearing cage parts are assembled, are snapped into the groove.

\* \* \* \* \*